United States Patent
Tsai et al.

(10) Patent No.: US 9,156,923 B2
(45) Date of Patent: Oct. 13, 2015

(54) OXIDIZING AGENT USEFUL FOR OXIDATIVE POLYMERIZATION OF HIGH CONDUCTIVE POLYMERS

(75) Inventors: Li-Duan Tsai, Hsinchu County (TW); Yi-Chang Du, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 611 days.

(21) Appl. No.: 12/588,323

(22) Filed: Oct. 13, 2009

(65) Prior Publication Data

US 2010/0099889 A1 Apr. 22, 2010

Related U.S. Application Data

(63) Continuation-in-part of application No. 11/384,368, filed on Mar. 21, 2006, now abandoned.

(30) Foreign Application Priority Data

Oct. 28, 2005 (TW) .............................. 94137859 A

(51) Int. Cl.
*A63D 3/00* (2006.01)
*C08F 4/26* (2006.01)
*C08F 4/40* (2006.01)

(52) U.S. Cl.
CPC .... *C08F 4/26* (2013.01); *C08F 4/40* (2013.01)

(58) Field of Classification Search
USPC ................. 252/500, 186.1; 548/404; 556/138
See application file for complete search history.

(56) References Cited

U.S. PATENT DOCUMENTS

| | | | |
|---|---|---|---|
| 3,985,718 A * | 10/1976 | Chabert et al. ................. | 526/113 |
| 4,910,645 A | 3/1990 | Jonas et al. | |
| 4,959,430 A | 9/1990 | Jonas et al. | |
| 6,056,899 A | 5/2000 | Lessner et al. | |
| 6,136,176 A | 10/2000 | Wheeler et al. | |
| 6,514,352 B2 * | 2/2003 | Gotoh et al. ...................... | 134/3 |
| 6,695,888 B2 * | 2/2004 | Bartolone et al. ................ | 8/405 |
| 7,279,534 B2 * | 10/2007 | Luebben et al. .............. | 525/410 |
| 2004/0169163 A1 | 9/2004 | Tsai et al. | |
| 2005/0013094 A1 * | 1/2005 | Reuter et al. .................. | 361/525 |

* cited by examiner

*Primary Examiner* — Monique Peets
(74) *Attorney, Agent, or Firm* — Bacon & Thomas, PLLC

(57) ABSTRACT

An oxidizing agent useful for oxidative polymerization of high conductive polymers is provided. This oxidizing agent is a kind of organic metal complex formed of metal ion salts having oxidizing capability and nitrogen-containing compound having lone pair electrons with partial π-electron character. This organic metal complex has weak oxidizing strength for monomers at room temperature. As such, a mixture of the organic metal complex and the monomers has long-term stability under room temperature. While, at a high temperature, the organic metal complex provides proper oxidative polymerization capability for the monomers. The conductive polymers synthesized by the organic metal complex have excellent conductivity.

10 Claims, 9 Drawing Sheets

Unit: g

| No. | EDOT | Ferric p-toluenesulfonate | Methanol | THF | Imidazole | 1-methylimidazole | 1,2 triazole | Pyridine |
|---|---|---|---|---|---|---|---|---|
| 1 | 0.4 | 1.6 | 1.06 | | | | | |
| 2 | 0.4 | 1.6 | 1.06 | 0.808 | | | | |
| 3 | 0.4 | 1.6 | 1.06 | | 0.191 | | | |
| 4 | 0.4 | 1.6 | 1.06 | | | 0.231 | | |
| 5 | 0.4 | 1.6 | 1.06 | | | | 0.194 | |
| 6 | 0.4 | 1.6 | 1.06 | | | | | 0.222 |

FIG. 1

Unit: S/cm

| Reaction temp \ Nitrogen-containing compound | None | Imidazole | 1-methylimidazole | Pyridine |
|---|---|---|---|---|
| 50°C | 4.905 | 16.09 | 5.103 | 5.240 |

FIG. 3

Unit: g

| No. | EDOT | Ferric p-toluenesulfonate | Methanol | Formamide | N-methylformamide | N,N-dimethylformamide |
|---|---|---|---|---|---|---|
| 1 | 0.4 | 1.6 | 1.06 | 0.25 | | |
| 2 | 0.4 | 1.6 | 1.06 | | 0.332 | |
| 3 | 0.4 | 1.6 | 1.06 | | | 0.411 |
| *4 | 0.4 | 1.6 | | | | 1.622 |

* represents that the molar ratio of N,N-dimethylformamide to ferric p-toluenesulfonate is 8

FIG. 4

Unit: S/cm

| Nitrogen-containing compound / Reaction temperature | None | Formamide | N-methylformamide | N,N-dimethylformamide | *(N,N-dimethylformamide) |
|---|---|---|---|---|---|
| 50°C | 4.905 | 9.710 | 11.804 | 8.017 | No reaction |

* represents that the molar ratio of N,N-dimethylformamide to ferric *p*-toluenesulfonate is 8

FIG. 6

Unit: g

| No. | EDOT | Ferric p-toluenesulfonate | Methanol | 1,3-dimethylurea | 1,1,3,3-tetramethlyurea |
|---|---|---|---|---|---|
| 1 | 0.4 | 1.6 | 1.06 | 0.248 | |
| 2 | 0.4 | 1.6 | 1.06 | | 0.501 |

FIG. 7

Unit: S/cm

| Nitrogen-containing compound<br>Reaction temp | None | 1,3-dimethylurea | 1,1,3,3-tetramethlvurea |
|---|---|---|---|
| 50°C | 4.905 | 17.50 | 12.98 |

Unit: g

| Retardant /iron ion (molar ratio) | | EDOT | Ferric p-tosylate | methanol | urethane | 1,1,3,3-tetramethyl-urea | Dimethyl-acetamide | succinimide | Triethyl-amine |
|---|---|---|---|---|---|---|---|---|---|
| 0 | | 1.75 | 7 | 8.7 | | | | | |
| Urethane series | 0.25 | 1.75 | 7 | 8.43 | 0.274 | | | | |
| | 0.5 | 1.75 | 7 | 8.153 | 0.547 | | | | |
| | 1.0 | 1.75 | 7 | 7.605 | 1.095 | | | | |
| | 2.0 | 1.75 | 7 | 6.51 | 2.19 | | | | |
| | 3.0 | 1.75 | 7 | 5.41 | 3.29 | | | | |
| | 4.0 | 1.75 | 7 | 4.32 | 4.38 | | | | |
| 1,1,3,3-tetra methyl-urea series | 0.25 | 1.75 | 7 | 8.34 | | 0.36 | | | |
| | 0.5 | 1.75 | 7 | 7.99 | | 0.71 | | | |
| | 1.0 | 1.75 | 7 | 7.27 | | 1.43 | | | |
| | 2.0 | 1.75 | 7 | 5.85 | | 2.85 | | | |
| | 3.0 | 1.75 | 7 | 4.41 | | 4.29 | | | |
| | 4.0 | 1.75 | 7 | 3.0 | | 5.7 | | | |
| Dimethyl-acetamide series | 0.25 | 1.75 | 7 | 8.432 | | | 0.268 | | |
| | 0.5 | 1.75 | 7 | 8.165 | | | 0.535 | | |
| | 1.0 | 1.75 | 7 | 7.63 | | | 1.07 | | |
| | 2.0 | 1.75 | 7 | 6.56 | | | 2.141 | | |
| | 3.0 | 1.75 | 7 | 5.48 | | | 3.22 | | |
| | 4.0 | 1.75 | 7 | 4.42 | | | 4.28 | | |
| Succinimide series | 0.25 | 1.75 | 7 | 8.4 | | | | 0.3 | |
| | 0.5 | 1.75 | 7 | 8.09 | | | | 0.61 | |
| | 1.0 | 1.75 | 7 | 7.48 | | | | 1.22 | |
| Triethyl-amine series | 0.25 | 1.75 | 7 | 8.39 | | | | | 0.31 |
| | 0.5 | 1.75 | 7 | 8.08 | | | | | 0.62 |
| | 1.0 | 1.75 | 7 | 7.46 | | | | | 1.24 |

- Retardant represents a compound having amide functional group.

FIG. 10

Unit: S/cm

| Retardant/iron ion (molar ratio) | pristine | urethane | 1,1,3,3-tetramethyl-urea | Dimethyl-acetamide | succinimide | Triethyl-amine |
|---|---|---|---|---|---|---|
| 0 | 4.41 | - | - | - | - | - |
| 0.25 | - | 4.88 | 5.40 | 5.93 | 5.19 | 4.26 |
| 0.5 | - | 5.99 | 7.24 | 7.29 | 5.91 | 3.58 |
| 1.0 | - | 5.79 | 7.98 | 9.44 | 7.28 | 1.64 |
| 2.0 | - | 4.88 | 6.50 | 6.39 | - | - |
| 3.0 | - | 3.45 | 2.78 | 1.95 | - | - |
| 4.0 | - | 2.11 | Trace sediment | Trace sediment | - | - |

➤ Retardant represents a compound having amide functional group.

FIG. 11

Unit: g

| Retardant/iron ion (molar ratio) | EDOT | Ferric p-tosylate | methanol | urethane | 1,1,3,3-tetramethylurea | Dimethyl-acetamide | succinimide | Triethyl-amine |
|---|---|---|---|---|---|---|---|---|
| 0 | 1.75 | 7 | 8.7 | | | | | |
| 2.0 | 1.75 | 7 | 6.51 | 2.19 | | | | |
| 2.0 | 1.75 | 7 | 5.85 | | 2.85 | | | |
| 2.0 | 1.75 | 7 | 6.56 | | | 2.141 | | |
| 1.0 | 1.75 | 7 | 7.48 | | | | 1.22 | |
| 0.25 | 1.75 | 7 | 8.39 | | | | | 0.31 |
| 1.0 | 1.75 | 7 | 7.46 | | | | | 1.24 |

➤ Retardant represents a compound having amide functional group.

FIG. 12

OXIDIZING AGENT USEFUL FOR OXIDATIVE POLYMERIZATION OF HIGH CONDUCTIVE POLYMERS

CROSS REFERENCES TO THE RELATED APPLICATIONS

This is a Continuation-in-part of U.S. application Ser. No. 11/384,368, filed Mar. 21, 2006, now pending.

BACKGROUND OF THE INVENTION

1. Field of the Invention

The present invention relates to an oxidizing agent useful for polymerization of high conductive polymer, more particularly a kind of metal ion complex formed of metal ion salts having oxidizing capability and one or a plurality of nitrogen-containing compounds.

2. Description of the Related Art

Since it was found that doped polyacetylene can exhibit electrical conductivity, considerable efforts have been invested in the development and application of new types of electrically conductive conjugate polymer. Currently most commonly applied conductive polymers include polypyrrole, polyaniline, polythiophene and the derivatives of those compounds and have been used in anti-static coating, electrolytic capacitor, printed circuit board, solar collector and light-emitting display.

Conductive polymers are synthesized mainly by electrochemical polymerization or oxidative polymerization. Electrochemical polymerization is achieved by dissolving monomers in a solution containing electrolytes and passing through current to form conjugate polymer at the anode. The electrolytes in the solution would undergo doping reaction in the process to endow the conjugate polymer with electrical conductivity. Oxidative polymerization entails oxidizing the monomers with oxidizing agent to cause polymerization and subsequently adding in dopant in gaseous or liquid phase to give the resulting polymer electrical conductivity. The electrochemical polymerization process is known to produce polymers with excellent conductivity, and can get free standing films of certain conducting polymers such as polypyrrole. However the application of this method is severely hampered by the requirements of processed object being electrically conductive and having high oxidation potential. Oxidative polymerization does not have such requirements. In this process, monomers, oxidant, dopant and solvent are mixed, and coating or impregnation can be carried out before monomers are massively polymerized into conductive polymer.

The practicality of oxidative polymerization and the difficulty of its processing technology are governed by the stability of monomer-oxidant mixture. The mixing of monomers and oxidant will induce the polymerization of monomers which causes the viscosity of the mixture to rise, making it difficult to be coated or impregnated onto the processed object. Thus how to obtain stable monomer-oxidant mixture and high conductive polymer are the focus in the research of oxidative polymerization.

In the example of making solid-state electrolytic capacitor, to reduce the reaction rate of oxidant-monomer mixture and prolong the processing time of the mixture, Friedrich Jonas et al. in their U.S. Pat. No. 4,910,645 discloses the use of large amount of solvent to dilute the concentration of monomers to below 10 wt % so as to slow down the reaction rate of monomer-oxidant solution at room temperature. But by impregnating a capacitor element with monomer-oxidant mixture, only small amount of conductive polymer is obtained in one impregnation, while the remaining part consists of residual reactants and large amount of solvent. This proposed process needs to go through 16 cycles of impregnation and polymerization to produce sufficient conductive polymers to fill the gap between the positive and negative foils of capacitor element (U.S. Pat. No. 6,136,176). Thus using conductive polymer as an electrode of solid state electrolytic capacitor has the drawbacks of complex process and high manufacturing cost.

Friedrich Jonas et al. also disclose in U.S. Pat. No. 4,959,430 a thiophene derivative—3,4-ethylenedioxythiophene which has lower polymerization rate after mixing with oxidant under room temperature and the resulting (poly(3,4-ethylenedioxythiophene) has excellent conductivity and thermal stability. But the polymerization rate of this monomer at room temperature when mixing with oxidant is still controlled by the concentration of oxidant. High oxidant concentration will affect significantly the room-temperature stability of mixture, hence restricting the processing conditions of oxidative polymerization.

Philip M. Lessner et al. in U.S. Pat. No. 6,046,899 discloses a complex formed by the mixture of oxygen-containing organic compound with specific low boiling point, e.g. tetrahydrofuran, and Fe (III) oxidizing agent, which reduces the oxidizing power of oxidizing agent so the mixture of monomer and oxidizing agent can be stably preserved for a longer period of time. After the capacitor element is impregnated with this mixture, the low-boiling solvent can be evaporated under high temperature, and monomers and oxidizing agent can react to form conductive polymer. The oxygen-containing compound disclosed in the aforesaid patent, e.g. tetrahydrofuran, acts as a polymerization retardant. But the complex formed of such compound and Fe (III) oxidizing agent does not have much effect on the oxidative capability of ferric ion, hence having limited effect on stabilizing the mixture of monomer and oxidizing agent at room temperature. This process fails to effectively simplify the process for preparing conductive polymer solid state electrolytic capacitor and reduce its cost.

Reuter et al. in US patent 2005/0013094 reveals a polythiophene conductive polymer polymerized by using a thiophene and a metal salt (such as iron(III), copper(II), chromium(VI), cerium(IV), manganese(IV), manganese(VII) and ruthenium(III)) as an oxidizing agent in the presence of a nitrogen-containing compound including the amide compounds (such as methylacetamide, dimethylacetamide, and dimethylformamide) as a solvent. Because the nitrogen-containing compound is used as a solvent, the molar ratio of the nitrogen-containing compound to a metal ion of the metal salt is so high that the monomer for forming the conductive polymer can not be polymerized. Therefore, the metal salt and the nitrogen-containing compound disclosed in US patent 2005/0013094 is not suitable to be used as an oxidizing agent for retarding the polymerization of the monomer for forming the conductive polymer at room temperature. Besides, US patent 2005/0013094 fails to disclose the molar ratio of the nitrogen-containing compound to a metal ion of the metal salt for retarding the polymerization of the monomer for forming the conductive polymer at room temperature.

Luebben et al. in US patent 2003/0088032 reveals block copolymers prepared by polymerization of intrinsically conducting polymer blocks having heteroaromatic monomers and non-conducting blocks of various chemical structures, wherein heteroaromatic monomers may have a urethane residue. Also, it discloses that chemical polymerization can be performed in the presence of an oxidizing agent such as inorganic salt of iron (III), chromium (IV) and copper (II). However, Luebben et al. fails to disclose the molar ratio of the nitrogen-containing compound to a metal ion of the metal salt for retarding the polymerization of the monomer for forming the conductive polymer at room temperature. Moreover, the urethane residue having amide group in US patent 2003/0088032 is used as a polymerizable monomer, not used as a retarder for weakening the oxidizing strength of metal ion at room temperature.

Lellouche, Jean-Paul in US patent 2006/0047067 discloses a novel polymerizable monomer having a residue capable of reacting with a nucleophile group. Said residue may include —NR$^1$R$^2$, wherein R$^1$ and R$^2$ independently represent H, —N-succinimide, —N-phthalimide, pentafluorophenyl, biotin, aromatics, sugars or 1,2-/1,3-amino alcohols. Also, it discloses a nitrogen-containing compound, such as dimethylformamide. Nevertheless, Lellouche, Jean-Paul does not disclose that the nitrogen-containing compound can be combined with a metal salt within specific molar ratio to be used as an oxidizing agent for retarding the polymerization of the monomer for forming the conductive polymer at room temperature.

Thus the focus of efforts on oxidative polymerization is to develop a process that effectively inhibits the room-temperature polymerization rate of monomer-oxidant mixture without at the same time affecting the conductivity of resulting polymer or adding to process difficulty.

SUMMARY OF THE INVENTION

To address the aforesaid problems, the present invention provides an oxidizing agent in the form of metal complex, which has weak oxidizing strength at room temperature and proper polymerization capability at high temperature. As such, the reaction of monomers and the oxidizing agent in the form of a complex is slow down or almost inhibited under room temperature. Instead, the mixture undergoes polymerization reaction at higher temperature to obtain polymer with excellent conductivity.

To achieve the aforesaid object, the new oxidizing agent provided by the present invention is an organic metal complex formed of metal ion salts having oxidizing capability and nitrogen-containing compounds having lone pair electrons with partial π-electron character. Furthermore, when the molar ratio of said nitrogen-containing compounds to metal ions of said metal salts is from 0.25 to 2.0 (preferably from 0.5 to 2.0), the organic metal complex can show the best result of reducing the room-temperature oxidizing capability of metal ion and reacting with monomer at higher temperature to get conducting polymer with good conductivity.

BRIEF DESCRIPTION OF THE DRAWINGS

FIG. 1 shows the composition (wt) of different reactants, oxidizing agents and solvents described in Example 1.

FIG. 3 shows the characteristics of conductive polymers synthesized according to Example 2 and comparative examples.

FIG. 4 shows the composition (wt) of different reactants, oxidizing agents and solvents described in Example 3.

FIG. 6 shows the characteristics of conductive polymers synthesized according to Example 4 and comparative example.

FIG. 7 shows the composition (wt) of different reactants, oxidizing agents and solvents described in Example 5.

FIG. 10 shows the composition (wt) of different reactants, oxidizing agents and solvents described in Example 7.

FIG. 11 shows the characteristics of conductive polymers synthesized according to Example 7 and comparative example.

FIG. 12 shows the composition (wt) of different reactants, oxidizing agents and solvents described in Example 8.

DETAILED DESCRIPTION OF THE INVENTION

Figure 2:
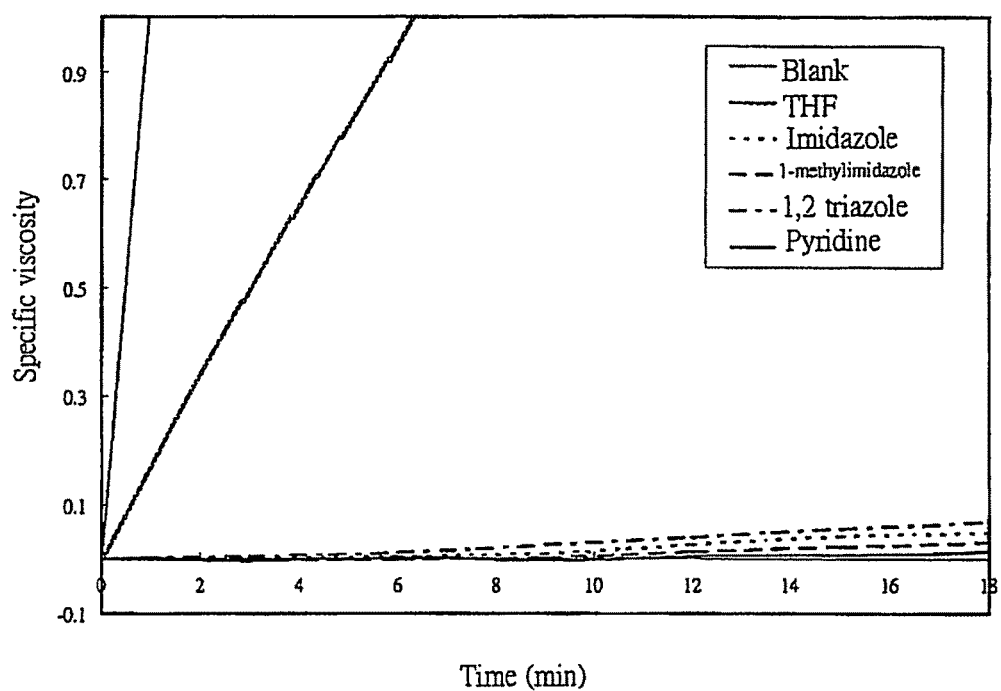
FIG. 2 shows the room temperature viscosity of mixtures of monomers and different oxidizing agent described in Example 1 versus time.

The detailed content and technology of the present invention are described below with accompanying drawings:

The present invention provides an oxidizing agent in the form of a complex that is useful for the synthesis of conductive polymer.

The implementation of the present invention is further depicted in the examples. First the reaction formula of the present invention is illustrated as follows:

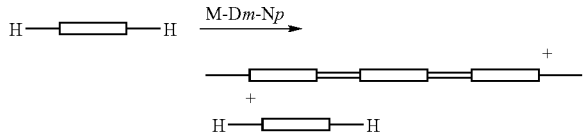

Aniline, pyrrole, thiophene, phenylvinylene and derivatives M-Dm-NP Organic metal complex, where
M Fe (III) salt; Cu (II) salt, Ce (IV) salt, Cr (VI) ion, etc.
D p-toluenesulfonate, naphthalene sulfonate, dodecylbenzenesulfonate,
organic sulfonate, perchlorate, and chlorine ion.
N five or six-membered cyclic, nitrogen-containing compound having the functional group of

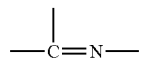

or nitrogen-containing compound having the functional group of

m, p>=1

Commonly seen commercial conductive polymers include polyaniline, polypyrrole, polythiophene, polyphenylvinylene, and derivatives of those polymers, e.g. poly(3,4-ethylenedioxythiophene).

Metal ion salts used as oxidizing agent in the oxidative polymerization of conductive polymer include Fe (III) salt and Cu (II) salt. In the example of poly(3,4-ethylenedioxythiophene), the oxidative polymerization using ferric p-toluenesulfonate as oxidizing agent can be expressed in formula (I), where p-toluene sulfonic acid formed by ferric p-toluenesulfonate after oxidation is the dopant for the polymer.

Aside from oxidizing agents such as benzene sulfonate, p-toluenesulfonate, naphthalene sulfonate, dodecylbenzenesulfonate, organic sulfonate, perchlorate, and ferric chloride, their reductants can also be used as dopant without the need of adding separate dopant. The use of other oxidizing agents requires the addition of dopant in order for poly(3,4-ethylenedioxythiophene) to exhibit high conductivity. Aside from the aforementioned p-toluenesulfonate and ferric chloride, commonly seen dopants include $AsF_6^-$, $BF_4^-$, $PF_6^-$, I, and monoprotic or polyprotic acid, such as sulfuric acid, phosphoric acid, hydrochloric acid, perchloric acid, and their salts and derivatives, e.g. polystyrene sulfonic acid (PSS) and salts.

The oxidative polymerization of monomers to obtain conductive polymer is affected by the oxidation potential level of monomer as well as the oxidizing capability of oxidizing agent. In the example of Fe (III) oxidizing agent, the Fe (III) ion would form a complex with a specific compound having lone pair electrons, which alters the oxidizing strength of Fe (III) ion. The stronger the complex bonding, the lower the oxidizing capability of the oxidizing agent. However, excessive complex bonding would cause the oxidizing agent to lose its oxidizing strength and strip its ability to synthesize long-chain conductive polymer.

The present invention uses nitrogen-containing compound having lone pair electrons with partial π-electron character to form proper complex bonding with metal ions with oxidizing capability so as to weaken the oxidizing strength of Fe (III) ion at room temperature. As such, the mixture of monomers and oxidizing agent can have good stability under room temperature in a system with low solvent content, while undergoes polymerization at a high temperature.

Nitrogen-containing compound having lone pair electrons with partial π-electron character includes five or six-membered cyclic compound having the functional group of

straight-chained or cyclic compound of amide, imide, urethane or urea having the functional group of

This kind of nitrogen-containing compound is far more powerful than oxygen-containing compound in forming a complex with Fe(III) ion. Thus its ability to retard the oxidizing capability of Fe (III) ion at room temperature is also far greater than that of oxygen-containing compounds. But the metal ion in the complex still retains good oxidizing capability at high temperature and will not harm the conductivity of the desired conducting polymer. In detail, while the molar ratio of said nitrogen-containing compounds to metal ions of said metal salts is from 0.25 to 2.0 (preferably from 0.5 to 2.0), said nitrogen-containing compounds can exert the best influence on reducing the room-temperature oxidizing capability of metal ions and conducting polymer with excellent good conductivity is polymerized at a higher temperature.

The present invention uses a five-membered cyclic compound having the functional group of

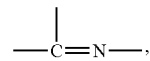

e.g. imidazole, 1-methylimidazole, pyrazole, triazole, pyridine, pyridazine, and derivatives thereof that can properly slow down the oxidizing capability of metal ion at room temperature or a little higher to form a complex with Fe (III) salt. The present invention also uses six-membered cyclic compound having the functional group of

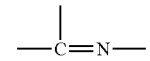

that has greater complexing capacity, e.g. pyridine, pyridazine or 1,2-diazine and derivatives thereof; compounds having amide functional group, e.g. formamide, N-methyl formamide, N,N-dimethylformamide, acetamide, N-methyl acetamide, and N,N-dimethylacetamide; compounds having imide functional group, e.g. succinimide, and phthalimide; compounds having urethane functional group, e.g. urethane; and compounds having urea functional group, e.g. urea, N,N'-dimethylurea, and tetramethylurea. Thus the mixture of monomers and oxidizing agent in the structure of a metal complex formed of metal ion salts having oxidizing capability and nitrogen-containing compound having lone pair electrons with partial π-electron character has good stability under room temperature. In detail, when the molar ratios of said nitrogen-containing compounds to metal ions of said metal salts is from 0.25 to 2.0 (preferably from 0.5 to 2.0), said nitrogen-containing compounds can exert the best influence on reducing the room-temperature oxidizing capability of metal ions and conducting polymer with excellent conductivity is polymerized at a higher temperature.

The technical means for achieving the objects of the present invention are illustrated in the examples below:

Example 1

Dissolve ferric p-toluenesulfonate listed in FIG. 1 with methanol and then mix it with a five or six-membered cyclic compound having the functional group of

according to the six compositions given in the table to form a complex. Add 3,4-ethylenedioxythiophene (EDOT) monomers to the complex, and measure the change of viscosity of the six mixtures under room temperature (25° C.) versus time to compare the long-term stability of the mixtures made of different oxidizing agents. The results are as shown in FIG. 2.

As shown in FIG. 2, the specific viscosity of mixture of ferric p-toluenesulfonate and monomers without the addition of five or six-membered cyclic compound having the functional group of

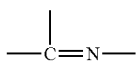

rose rapidly, suggesting the rapid progression of polymerization reaction. With such speed of viscosity variation, there won't be sufficient time to process or use this mixture. Although the ferric p-toluenesulfonate solution that contains tetrahydrofuran can slow down moderately the polymerization of monomers in the mixture, its mixture with monomers does not exhibit as good room-temperature stability as the other four mixtures containing metal complex formed of ferric p-toluenesulfonate with imidazole, 1-methylimidazole, triazole, or pyridine.

Example 2

Dissolve ferric p-toluenesulfonate listed in FIG. 1 with methanol and then mix it with a five or six-membered cyclic compound having the functional group of

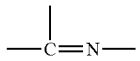

according to the six compositions given in the table to form a complex. Add 3,4-ethylenedioxythiophene (EDOT) monomers to the complex and allow it to react for three hours under 50° C., and then wash thoroughly with methanol, dry and made into pellet. Measure the conductivity of resulting PEDOT to compare the characteristics of PEDOT synthesized by different metal complex as shown in FIG. 3.

The results in FIG. 3 show that polymer synthesized by the new oxidizing agent provided herein exhibits more superior conductivity.

Example 3

Dissolve ferric p-toluenesulfonate listed in FIG. 4 with methanol and then mix it with a compound having amide functional group according to the four compositions given in the table to form a complex. Add 3,4-ethylenedioxythiophene (EDOT) monomers to the complex, and measure the change of viscosity of the four mixtures under room temperature (25° C.) versus time to compare the long-term stability of the mixtures made of different oxidizing agents. The results are as shown in FIG. 5.

Figure 5:
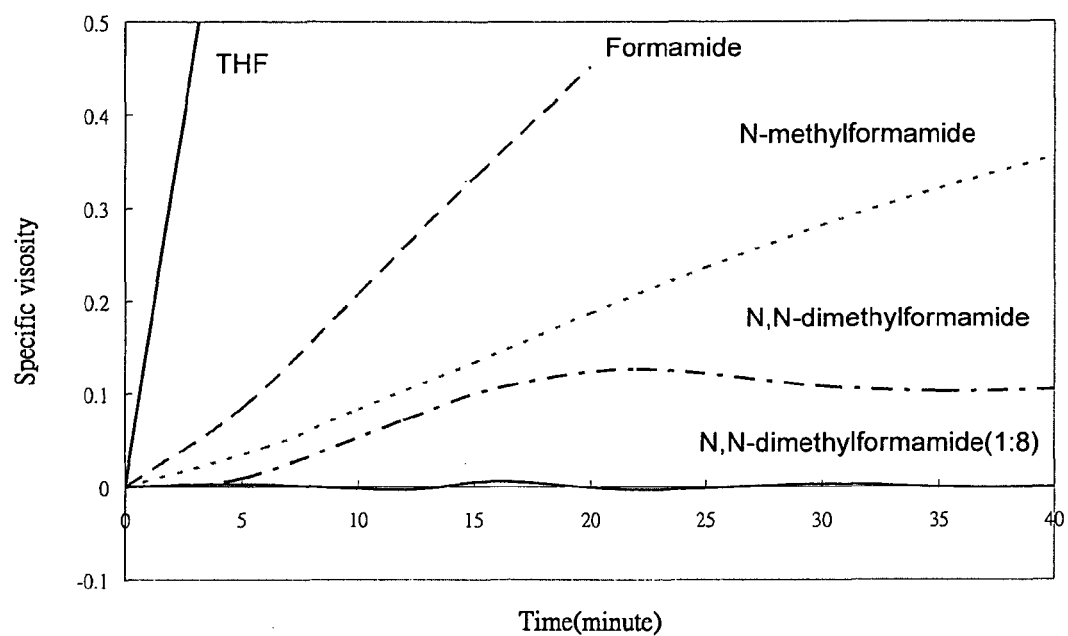
FIG. 5 shows the room temperature viscosity of mixtures of monomers and different oxidizing agent described in Example 3 versus time.

As shown in FIG. 5, the mixture of monomers and THF-containing ferric p-toluenesulfonate does not exhibit as good room-temperature stability as the other four mixtures containing metal complex formed of ferric p-toluenesulfonate with formamide, N-methylformamide, or N,N-dimethylformamide with different amounts.

Example 4

Dissolve ferric p-toluenesulfonate listed in FIG. 4 with methanol and then mix it with a compound having amide functional group according to the four compositions given in the table to form a complex. Add 3,4-ethylenedioxythiophene (EDOT) monomers to the complex and allow it to react for three hours under 50° C., and then wash thoroughly with methanol, dry and made into pellet. Measure the conductivity of resulting PEDOT to compare the characteristics of PEDOT synthesized by different metal complex as shown in FIG. 6.

The results in FIG. 6 show that polymer synthesized by the new oxidizing agent provided herein exhibits more superior conductivity except that the monomers can not be polymerized when the molar ratio of N,N-dimethylformamide to ferric p-toluenesulfonate is 8. Hence, the combination of N,N-dimethylformamide with ferric p-toluenesulfonate at the molar ratio of 8 is not suitable to be used as an oxidizing agent for retarding the polymerization of the monomer for forming the conductive polymer at room temperature.

Example 5

Dissolve ferric p-toluenesulfonate listed in FIG. 7 with methanol and then mix it with a compound having urea or urethane functional group according to the two compositions given in the table to form a complex. Add 3,4-ethylenedioxythiophene (EDOT) monomers to the complex, and measure the change of viscosity of the two mixtures under room temperature (25° C.) versus time to compare the long-term stability of the mixtures made of different oxidizing agents. The results are as shown in FIG. 8.

Figures 8, 9:
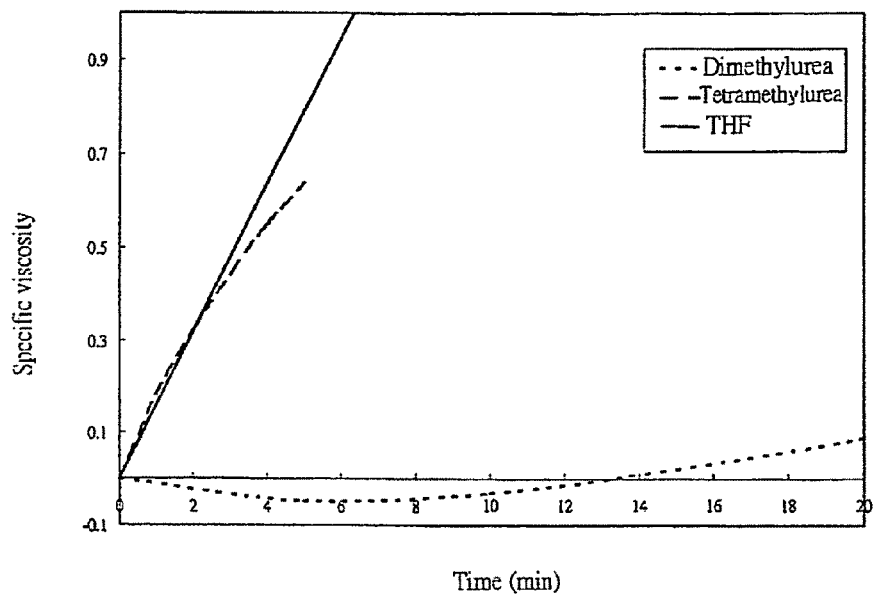
FIG. 8 shows the room temperature viscosity of mixtures of monomers and different oxidizing agent described in Example 5 versus time.
FIG. 9 shows the characteristics of conductive polymers synthesized according to Example 6 and comparative example.

As shown in FIG. 8, the specific viscosity of the mixture of monomers and ferric p-toluenesulfonate that is not added with any compound having urea or urethane functional group rose rapidly, suggesting the rapid progression of polymerization reaction. Although the ferric p-toluenesulfonate solution that contains tetrahydrofuran can slow down the polymerization of monomers in the mixture, its mixture with monomers does not exhibit as good room-temperature stability as the other two mixtures containing metal complex formed of ferric p-toluenesulfonate with 1,3-dimethylurea or 1,1,3,3-tetramethlyurea.

Example 6

Dissolve ferric p-toluenesulfonate listed in FIG. 7 with methanol and then mix it with a compound having urea or urethane functional group according to the two compositions given in the table to form a complex. Add 3,4-ethylenedioxythiophene (EDOT) monomers to the complex and allow it to react for three hours under 50° C., and then wash thoroughly with methanol, dry and made into pellet. Measure the conductivity of resulting PEDOT to compare the characteristics of PEDOT synthesized by different metal complex as shown in FIG. 9.

The results in FIG. 9 show that polymer synthesized by the new oxidizing agent provided herein exhibits more superior conductivity.

The mixture of monomers with metal complex oxidizing agent disclosed herein not only has long-term stability at room temperature, polymer synthesized at a high temperature thereof also possess high conductivity.

Example 7

A series of metal complex solutions with various molar ratios of compounds having amide functional group to ferric p-tosylate in the presence of MeOH are prepared according to the formulas listed in FIG. 10. Urethane, tetramethylurea, dimethylacetamide and succinimide are selected as the compound having amide functional group, respectively. In addition, triethylamine is the antithesis. The concentration of ferric p-toluenesulfonate in these complex solutions containing metal complexes and MeOH is 44 wt %. Add 3,4-ethylenedioxythiophene (EDOT) monomers to each of the complex solutions and allow it to react for two hours under 65° C., and then wash thoroughly with methanol, dry and made into pellet. Measure the conductivity of resulting PEDOT to compare the characteristics of PEDOT synthesized by different metal complex as shown in FIG. 11.

The results in FIG. 11 show that when the molar ratio of urethane, tetramethylurea or dimethylacetamide to the metal ion of the metal salt is from 0.25 to 2.0, the metal complex can react with EDOT monomer to form conducting polymer with better conductivity not less than pristine conducting polymer. For the sake of the solubility, the highest molar ratio of succinimide to ferric p-tosylate is 1.0 in this example. Nevertheless, the molar ratio of succinimide to the iron (III) ion ranging from 0.25 to 1.0 in the succinimide-ferric p-tosylate complex can exert positive influence on the conductivity of the resulting conducting polymer as well. Reversely, the conductivity of the conducting polymer is decreased with increasing the molar ratio of triethylamine to ferric p-tosylate in the antithesis and is less than that of the pristine conducting polymer.

Example 8

To evaluate the stability of the mixture of monomer and metal complex solution formed of a metal salt having oxidizing capability and a nitrogen-containing compound having amide functional group in the presence of MeOH a series of metal complex solutions containing metal complexes and MeOH with 2.0 molar ratio of urethane, tetramethylurea or dimethylacetamide to ferric p-tosylate are prepared. For the sake of the solubility, the molar ratio of succinimide to ferric p-tosylate is 1.0. In addition, triethylamine is the antithesis in which the molar ratio of triethylamone to ferric p-tosylate is 0.25 or 1.0. The concentration of ferric p-toluenesulfonate in these complex solutions is 44 wt %. Add 3,4-ethylenedioxythiophene (EDOT) monomers to each of the complex solutions and measure the viscosity of the mixtures versus time under room temperature. The detail formulas are listed in FIG. 12 and the plot of specific viscosity versus time is shown in FIG. 13.

Figure 13:
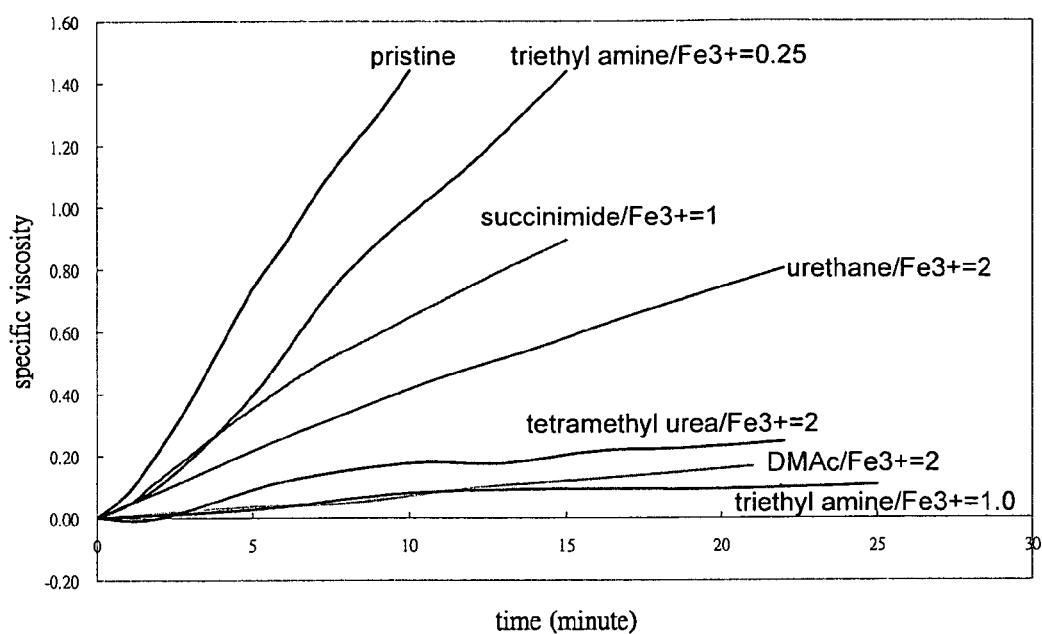
FIG. 13 shows the room temperature viscosity of mixtures of monomers and different oxidizing agent described in Example 8 versus time.

As shown in FIG. 13, the specific viscosity of the mixture of ferric p-toluenesulfonate and monomer without the addition of any compounds having amide group in the presence of MeOH rose rapidly, suggesting the rapid progression of polymerization reaction. Although the antithesis that contains 1.0 molar ratio of triethylamine to ferric p-tosylate shows good stability under room temperature, triethylamine-ferric p-tosylate complex solution with greater than 0.25 molar ratio will be apparently harmful to the conductivity of the result conducting polymer according to the result of example 7. Furthermore, the mixture containing 0.25 molar ratio of triethtylamine to ferric p-toluenesulfonate does not exhibit as good room-temperature stability as the other mixtures containing metal complex formed of ferric p-toluenesulfonate with urethane, tetramethylurea, dimethylacetamide or succinimide. Therefore, triethylamine is not a proper retarder. That is, it is not suitable for combining with a metal salt to be used as an oxidizing agent for retarding the polymerization of the monomer for forming the conductive polymer at room temperature.

From the above examples, it is apparent that within the molar ratios of metal salts having oxidizing capability to said nitrogen-containing compounds having amide group ranging from 0.25 to 2.0, the nitrogen-containing compounds having amide functional group reduce the room-temperature oxidizing capability of metal ions without affecting their oxidizing capability at high temperature and conducting polymer with good conductivity is polymerized at higher temperature. Although triethylamine, a kind of nitrogen-containing compounds, can retard the reaction of ferric oxidizing agent and EDOT monomer under room temperature, it harms the conductivity of the resulting conducting polymer. Therefore, it is not the general property for all nitrogen-containing compounds that can complex with ferric oxidizing agent to stabilize the mixture of ferric oxidizing agent and monomer under room temperature without harming the conductivity of the result conducting polymer. In our invention, it shows that the mixture of monomers and oxidizing agent in the structure of a metal complex formed of metal ion salts having oxidizing capability and nitrogen-containing compounds having lone pair electrons with partial π-electron character has good stability under room temperature, and can be used to synthesize polymer with excellent conductivity as the reaction temperature rises above room temperature.

The preferred embodiments of the present invention have been disclosed in the examples. However the examples should not be construed as a limitation on the actual applicable scope of the invention, and as such, all modifications and alterations without departing from the spirits of the invention and appended claims, including the other embodiments shall remain within the protected scope and claims of the invention.

What is claimed is:

1. An oxidizing agent for synthesizing a conductive polymer by oxidative polymerization, comprising at least a complex formed of at least a metal salt having oxidizing capability and at least a nitrogen-containing compound having lone pair electrons with partial π-electron character, wherein:
the molar ratio of the nitrogen-containing compound having lone pair electrons with partial π-electron character to a metal ion of the metal salt having oxidizing capability is from 0.25 to 1.0;
the nitrogen-containing compound having a lone pair electrons with partial π-electron character contains the following functional group:

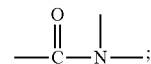

and
the metal ion is Fe(III).

2. The oxidizing agent according to claim 1, wherein the nitrogen-containing compound having lone pair electrons with partial π-electron character is selected from the group consisting of: amide compound, imide compound, urea compound and urethane compound.

3. The oxidizing agent according to claim 2, wherein the amide compound is selected from the group consisting of formamide, N-methyl formamide, N,N-dimethylformamide, acetamide, N-methyl acetamide, N,N-dimethylacetamide, and derivatives thereof.

4. The oxidizing agent according to claim 2, wherein the imide compound is selected from the group consisting of succinimide, phthalimide, and derivatives thereof.

5. The oxidizing agent according to claim 2, wherein the urea compound is selected from the group consisting of urea, N,N'-dimethylurea, tetramethylurea, and derivatives thereof.

6. The oxidizing agent according to claim 2, wherein the urethane compound is selected from the group consisting of urethane and derivatives thereof.

7. The oxidizing agent according to claim 1, wherein the metal salt having oxidizing capability is selected from the group consisting of trivalent iron salt and Cu(II) salt.

8. The oxidizing agent according to claim 1, wherein the metal salt having oxidizing capability is selected from the group consisting of metal salts of benzene sulfonate, p-toluenesulfonate, naphthalene sulfonate, dodecylbenzenesulfonate, organic sulfonate, perchlorate, and chloride.

9. The oxidizing agent according to claim 1, wherein the conductive polymer is from monomers selected from the group consisting of thiophene, pyrrole, phenylvinylene, aniline, derivatives thereof, and any combination thereof.

10. The oxidizing agent according to claim 9, wherein the monomers are 3,4-ethylenedioxythiophene.

* * * * *